Patented May 14, 1940

2,200,784

UNITED STATES PATENT OFFICE 2,200,784

FLOCCULATING AQUEOUS LIQUIDS

Fredrick J. Wallace, Erie, Pa., assignor to Robeson Process Company, New York, N. Y., a corporation of New Jersey No Drawing. Application January 12, 1939, Serial No. 250,634

8 Claims. (Cl. 210—2)

This invention or discovery relates to flocculating aqueous liquids; and it comprises a method of clarifying aqueous liquids carrying matters of colloidal fineness in suspension with recovery of the clarified liquid and of the suspended matters therein by flocculation wherein such a liquid receives an addition of solubilized alkaline recovered lignin, the lignin so added is flocculated and precipitated in situ and the resulting precipitate of lignin carrying the suspended matter and the clarified aqueous liquid are separated and recovered; and it further comprises as a new composition of matter, particularly adapted for treating aqueous liquids, a dry, fine grained, readily dissolving composition of matter containing recovered lignin with sufficient soda to make it soluble; all as more fully hereinafter set forth and as claimed.

In clarifying aqueous suspensions, for the purpose of either recovering clarified water or suspended matter of colloid fineness with which ordinary separation by settling and filtration is impracticable, flocculants are desirable to enclose and carry down the suspended matter. Hydrated alumina is sometimes used. It comes down in gelatinous or slimy form, carrying down suspended matters more or less perfectly. It may be produced either by the use of aluminum sulfate or sodium aluminate. In either case there are some objections. The coagulum is not readily filter-pressed and handled and in cases where the suspended matter is the valuable thing, it is contaminated by alumina.

I have discovered that a much more desirable form of floc can be produced by the use of recovered lignin; lignin recovered from alkaline paper mill waste liquors. If this be solubilized with a little caustic soda and added to the water and the alkalinity is obviated to say a reaction of not over 6.5 pH, lignin comes down in a flocculent form, carrying the suspended solids or liquids and giving a precipitate which settles readily and is readily filter-pressed and handled. A preparation useful for this purpose is dry recovered lignin containing enough caustic soda to render it soluble in water. If the aqueous liquid to be treated is already sufficiently acid, no further acid need be added but commonly it is necessary to add afterwards an acid or acid material to obviate the alkalinity of the soda added to the lignin for solubilizing. However, in some cases, and particularly with lignin recovered from black liquor by $CO_2$, gassing with $CO_2$ or with stack gases may suffice to neutralize the alkali and produce a floc in the turbid liquid.

Wood is largely composed of lignocellulose; lignin and cellulose in some form of combination. In making paper pulp, chipped wood is treated with reagents adapted to bring the lignin into aqueous solution, leaving the cellulose as an insoluble residue. In the so-called soda process, the wood is extracted with caustic soda under high pressure and temperature, and the lignin with some minor constituents goes into solution as soda compounds. The liquid is termed soda black liquor. From the solution a lignin can be precipitated, along with some associated resins, by neutralization or acidification. The lignin being largely insoluble in water, the precipitate can be washed free of soluble matters leaving a fairly pure lignin. The lignin is not identical with natural lignin, that is lignin as it exists in the wood, but has rather parallel properties. It may be called "recovered lignin". In lieu of extracting wood with caustic soda, in the sulfate or kraft processes alkaline extracting solutions are employed containing various sulfur compounds; sulfides, polysulfides, thiosulfates, sulfates, etc. Such pulp making processes also yield aqueous lignin solutions; these also containing sulfur compounds, and being known as sulfate black liquors. These liquors can be acidified to cause precipitation of lignin, and the lignin washed free of soluble matters and recovered in fairly pure form. Such lignin is not identical with the precipitated lignin from soda process liquors but is quite similar thereto and is here included in the term "recovered lignin". Liquors obtained by alkaline extraction of other vegetable substances such as straw, jute or corncobs are also suitable as a source of recovered lignin. The lignin obtained from these alkaline extraction liquors differ not only from natural lignin but also from the lignin compounds extracted from wood by various organic solvents and the sulfonated lignin derivatives obtained by the so-called bisulfite processes.

In recovering lignin from the black liquors it is best to use highly ionized acids, of which sulfuric acid is the most useful. Hydrochloric, nitric and chlorosulfonic acids are also useful. Weaker acids such as acetic and carbonic acids give lignins of somewhat different character but also useful for the present purposes. Carbon dioxide can be used to precipitate the lignin from the black liquors, the solution being blown with carbon dioxide or flue gas under pressure. This yields a lignin which is in its immediate precipitated form, rather more soluble in water than the lignin obtained by acidification of the liquor with strong acids, but if care be taken in washing the lignin the carbon dioxide recovery process is satisfactory.

Some black liquors contain resinous matter going down with lignin and this can be removed from the dry lignin with solvents (gasoline, etc.) but for the most part in preparations for the present purposes it may be allowed to remain.

These recovered lignins, while largely insoluble in plain water can be readily dissolved with the aid of alkalis to form rather concentrated lignin solutions. Such solutions may be freed of water and converted into convenient dry preparations. The present invention is based on the discovery that solutions of recovered lignin can be mixed in small amounts with suspensions carrying matter of colloidal fineness and then the mixture acidified, whereupon the lignin promptly comes out of solution as a coarse flocculent, voluminous precipitate of such character as to entrain the suspended matter in a remarkably effective manner. Ordinarily the proportion of lignin solution to be added to the turbid suspension is very small, and care is taken in operation to mix the lignin thoroughly with the aqueous suspension prior to acidification. After acidification the precipitate is allowed to settle by gravity, the settling sometimes being assisted by a gentle stirring, and the clear liquid separated therefrom by decantation or filtration. If the suspension to be treated is already sufficiently acid, that is, having a pH of 6.5 or less, the recovered lignin solution can be simply mixed in and precipitation allowed to take place, no separate acidification step being necessary. When the suspension is already acid, for best results the lignin solution should be mixed in quickly and thoroughly by efficient mixing apparatus.

In preparing the recovered lignin solutions for use as deflocculating agents, it is best to use just enough alkali to bring the recovered lignin into solution. Generally from 2 to 3 per cent of NaOH by weight on the dry lignin suffices. Solutions containing 33 per cent lignin by weight are readily prepared. Such solutions have pH values ranging from 8 to 9.

The following examples illustrate the preparation of flocculating agents useful in the commercial practice of the present invention from two types of factory black liquor.

*Example 1*

This example illustrates the preparation of the flocculating agent from a spent sulfate black liquor obtained as a byproduct in the manufacture of paper pulp by the kraft process; this particular liquor having a solid content of 19.10 per cent and a free alkalinity of 2.1 per cent calculated as NaOH. This liquor was mixed with sulfuric acid in the proportion of 10 kilograms of black liquor and 760 grams of a 50 per cent (by weight) solution of sulfuric acid. The lignin promptly precipitated as a brown, flocculent material. The mixture was aerated, under agitation, to remove volatile sulfur compounds, was allowed to settle for two hours and was then heated to 160° F. to coagulate the lignin. The mixture was filtered to separate the lignin and the lignin was washed with slightly acidified water to remove soluble sulfates, dried, and ground to a powder, with a yield of 870 grams from the amount of liquid stated. The powder was suspended in about twice its weight of water (1760 grams water) and 52 grams of solid caustic soda mixed in, whereupon the recovered lignin redissolved, forming a stable solution of about 33 per cent concentration, and of pH about 8.9.

*Example 2*

In this example the source of lignin was a soda process black liquor, a byproduct from the soda process cook of wood pulp, having a free alkalinity of 2.90 per cent and a total solids content of 22.29 per cent. One thousand parts by weight of the liquor were treated with 100 parts of a 50 per cent (by weight) solution of $H_2SO_4$. The lignin precipitated at once. The mixture was agitated for two hours, and heated to 160° F., to coagulate and flocculate the lignin precipitate, and the lignin was filtered off, washed and dried. About 81 parts by weight of dry lignin were recovered. The dry lignin was dispersed in twice its weight (162 parts) of water and 4 parts of NaOH were mixed in, whereupon the lignin redissolved. The pH of the solution was 9.0.

The alkaline solutions of lignin obtained in each of the above examples are advantageous flocculating agents and are particularly useful in treating sewage and other aqueous colloidal suspensions, giving clarified water of low solid content and an easily pressed deposit.

The invention is particularly applicable to the treatment of sewage. In sewage disposal plants, whatever the mode of treatment employed there is obtained at some stage of operations a large volume of water contaminated with colloidally dispersed particles of organic matter which must be removed so that the water can be utilized or discharged into streams or lakes. In the so-called activated sludge processes, raw sewage is thoroughly admixed with an activated sludge (obtained from a later step in the process) containing aerobic bacteria, and the mixture is blown with fine jets of air, to circulate the mixture and to supply the air necessary for the activity of the sludge bacteria. Fermentation takes place and in due course the air circulatoin is stopped and the mass allowed to stand quiet. The sludge settles out, leaving a supernatant turbid liquor, which after further purification is discharged into streams, etc. Part of the sludge is then reactivated by air blowing and used in the fermentation of more raw sewage. The rest of the sludge is dried and sold for fertilizer. Similar turbid liquors are obtained by the older slow digestion sewage disposal processes, and in raw sewage treatment processes. In raw sewage treatment plants, sewage is first passed through a rough bar screen, then through a fine bar screen, then through a shallow grit chamber, and finally passes into a clarifier. The clarifier is usually of the Dorr thickener type. Readily settable matter settles out as a sludge, and the clarified effluent is discharged into streams, etc., sometimes after a chlorination. Under the improvement of the present invention a solution of recovered lignin is admixed with the sewage after it leaves the grit chamber and before it enters the clarifier. The clarification step is thereby made much more complete and effective; the clarified liquor is purer and less objectionable.

Whatever the aqueous liquid to be clarified under the present invention, assuming it to be neutral or alkaline, a small proportion of recovered lignin in alkaline solution is thoroughly mixed with the impure turbid liquor and then enough acid, advantageously a strongly ionized acid, is mixed into the suspension to make the mixture acid; to bring the pH value below 7 (neutrality). Thereupon the lignin precipitates in coarse flocs, and carries to the bottom of the tank suspended sludge, protein bodies and all other colloidal matter, leaving the supernatant solution remarkably clear and suitable for discharge into rivers without any further purification. If the turbid liquor is already acid, lignin begins to precipitate as described upon addition of the lignin solution to the liquor.

The invention can also be used to advantage in treating the sludge itself. The sludge resulting from the activated sludge digestion process is ordinarily a gelatinous mass containing a high proportion of water, difficult to dry and dispose of. According to the invention a lignin solution can be mixed with this sludge and the mixture acidified sufficiently to bring the pH to about 4.5, whereupon a contraction and flocculation of the gelatinous sludge takes place, yielding a product which can be handled and dried readily.

The invention is also advantageous in the treatment of suspended pigments, to recover the pigment in useful form. Certain pigments are produced as finely divided precipitates in aqueous suspension, which settle only very slowly, while with others, as with umber, a pigment is refined by elutriation to recover fine particles. In elutriation the final liquors may still carry valuable pigment in such a fine state as to make it difficult to remove and recover. The pigment can be recovered expeditiously by addition of a small proportion of recovered lignin solution and acidification. The treatment is also useful as applied to waste liquors from pigment factories to recover contained pigment and render the liquors unobjectionable for disposal in streams, etc.; either or both.

The following examples are typical embodiments of the present invention and illustrate several flocculating and coagulating treatments of aqueous suspension within the purview of the same.

Example 3

A quantity of 10,000 parts by weight of raw domestic sewage having a settlable solids content of 0.5 per cent (Imhoff cone 1 hour) and an evaporation residue of 901 parts per million were treated with one part alkaline lignin solution produced as described in Example 2. Sulphuric acid was then added, with agitation, in amount sufficient to lower the pH value of 6.0. The lignin immediately precipitated as a flocculent mass and settled rapidly, carrying down suspended dispersed substances of the sewage. The supernatant effluent was recovered by decantation. The effluent showed a settlable solids content of 0.0 per cent (Imhoff cone 1 hour) and an evaporation residue of 247 parts per million—a reduction of 654 parts per million. This effluent was much purer than raw untreated sewage passed through a regular clarifier system, and was suitable for direct discharge into streams or lakes.

Example 4

A quantity of 10,000 parts of effluent from a conventional activated-sludge digestion, having an evaporation residue of 240 parts per million, was treated with 0.5 part of lignin solution obtained as described in Example 1. The mixture was then acidified with sulphuric acid to 6.0 pH. The lignin precipitated immediately carrying down colloidally dispersed proteins and suspended matter. Supernatant fluid separated from the residue showed an evaporation residue of 74 parts per million; a reduction of 166 parts per million.

Example 5

A quantity of 5,000 parts of a gelatinous sludge produced by the activated sludge digestion process containing 96 per cent water and 4 per cent solids in the form of biological jelly was treated with 5 parts of lignin solution and the whole was acidified with sulphuric acid to a pH value of 5. The lignin immediately precipitated as a coarse, flocculent mass, causing coagulation of the jelly and conversion of the mass into a friable, readily dried aggregate.

The following example illustrates the utilization of the invention in the recovery of fine solid particles from suspension;

Example 6

A batch of 1000 pounds (120 gallons) of water containing 50 pounds of an oxide ore in finely divided suspension, all the ore particles being of minus 350-mesh particle size, was admixed with 0.5 pound lignin solution obtained as described in Example 1 and the mixture was acidified, under thorough agitation, with sulfuric acid in quantity sufficient to bring the pH to 5.0. Thereupon the lignin promptly precipitated in flocculent condition, carrying down substantially all the suspended particles. The supernatant liquor contained only 0.002 per cent of suspended solids, as compared with its initial 5 per cent solid content.

Other mineral pulps of similar physical character can be treated as described in Example 6 with equally advantageous results.

Example 7

A batch of 1000 pounds of water containing 10 pounds of umber in finely divided suspension (average particle size 0.002 mm.) was treated with 1 pound of lignin solution described in Example 2. The suspension was acidified with sulphuric acid to a pH of 5.0. The lignin precipitated immediately as a flocculent mass, and settled rapidly, carrying down all the suspended solids. The suspension after treatment contained only 0.01 per cent suspended solids. Similar results are obtained with other suspensions of similar physical character.

The following example shows the utility of the invention in clarifying turbid waters.

Example 8

A batch of 1000 pounds of water carrying clay in finely divided clay suspension in the proportion of 1200 parts of clay per million were treated with 0.5 pound of lignin solution obtained as described in Example 1 and the suspension then acidified with sulphuric acid to a pH of 5.0. The lignin precipitated immediately and carried down with it practically all the suspended clay particles. The clarified water had a suspended solids content of only 18 parts per million—a reduction of 1182 parts per million of suspended solids.

Treatment of coal slurries from coal washing operations is becoming an important practical problem. It is desirable to recover the coal not only to save waste of coal, but also to render the wash water innocuous for disposal in streams. Coal slurries from washing operations are quite objectionable from the stream pollution standpoint. The finer coal particles tend to remain in suspension with surprising persistence and recovery is difficult; but separation is expeditiously carried out by the process of the present invention, as illustrated in the following example. The small amount of lignin which occurs in the recovered coal is itself combustible.

Example 9

A batch of 1000 parts of a coal slurry containing very finely divided suspended coal particles and having a suspended solids content of 0.7 per cent, was treated with 0.5 pound of lignin solution obtained as described in Example 2. The mass was then acidified with sulphuric acid to a pH of 5.0. The lignin precipitated immediately carrying down with it practically all the suspended coal particles. The discharged supernatant liquid had a suspended solids content of only 0.01 per cent.

In the preceding examples the invention has been described in connection with removing finely divided solid substances from suspension. However it is equally well applicable to treatment of suspensions of liquids in liquids, i. e. emulsions, for the purpose of clarifying the liquid which forms the outer phase of the emulsion, or for the purpose of recovering the inner (suspended) phase in useful form. The following example illustrates the process applied to breaking an oil-in-water emulsion.

Example 10

A quantity of 1000 parts of an emulsion containing 10 per cent mineral oil and 90 per cent water having the oil as the internal phase and the water as the continuous phase and containing a small amount of naphthenic acids as an emulsifying or stabilizing agent, was treated with 0.5 part of lignin solution described in Example 2. Sufficient acid was added to lower the pH value to 6.0, at which point the lignin precipitated as a flocculent mass causing an almost immediate separation of the emulsion.

Reversed emulsions, that is, emulsions of the water-in-oil type, also yield successfully to treatment by the processes of the present invention, as illustrated in the following example.

Example 11

The emulsion to be broken contained about 90 per cent crude petroleum oil as the external phase and 10 per cent of water as the internal phase, together with a small amount of aluminum stearate as stabilizing agent. The emulsion approximated in composition, physical character and behavior, typical oil-field emulsions. To 100 parts by weight of the emulsion was added with thorough agitation, 0.5 part lignin solution obtained as in Example 2. Sufficient acid was admixed to bring the pH value to 6.0, whereupon the lignin precipitated in flocculent form, and separation of the emulsion into an oil layer and an aqueous layer took place.

In some cases, in lieu of recovering lignin in purified form from a black liquor and redissolving the lignin to form a concentrated flocculating agent, the black liquor can be used directly, being added to the suspension to be treated and acidified. However, the concentrated recovered lignin solutions usually give much more advantageous results, and do not add contamination by the non-lignin constituents of black liquor. Furthermore, in the acidification step the lignin comes out in a coarse flocculent condition which is more efficacious in entraining the suspended matters, than the lignin directly precipitated from black liquors upon acidification thereof.

Commercial preparations useful for the present purposes can be made by admixing recovered lignin with the right amount of strong caustic soda solution, drying and grinding to a fine grained powder. Drying is best done at low temperatures. Such a preparation can be dissolved in any desired amount of water and the solution admixed with the turbid liquid to give a clarified liquid and suspended solids as a precipitate, such precipitate being susceptible of easy filter-pressing and drying.

What I claim is:

1. In the treatment of aqueous liquid carrying suspended matter of colloid fineness with recovery of clarified liquid and of suspended matter, the process which comprises adding to such a liquid alkalized recovered lignin, flocculating the lignin and separating the clear liquor and the solid carried down by the lignin floc.

2. A method of conglomerating colloidal substances in liquid aqueous suspension which comprises admixing with the suspension an alkaline solution of a recovered lignin, bringing the pH of the mixture to below 7 whereby lignin precipitates out entraining the suspended substances, and separating the precipitate from the liquid.

3. A method of flocculating colloidal substances in aqueous suspensions having a pH of 7 or higher, which comprises admixing with the suspension an alkaline suspension of recovered lignin, admixing acid in amount sufficient to bring the pH to below 7, whereby lignin precipitates out entraining the suspended substances, and separating the precipitate from the water.

4. The method of claim 2 wherein the liquid suspension treated is sewage disposal plant effluent water containing colloidal organic matter.

5. The method of claim 1 wherein the liquid suspension is a gelatinous sewage disposal plant sludge, and the pH of the mixture is brought to pH 4.5 whereby to precipitate the sludge in compact form.

6. A method of conglomerating colloidal substances in liquid suspension which comprises admixing with the suspension, at a pH above 7, an alkaline lignin solution, admixing acid in amount sufficient to bring the pH to about 6, whereupon the lignin precipitates entraining the suspended substances, and separating the precipitate from the liquid.

7. The method of claim 2 wherein the recovered lignin solution is obtained from a black liquor by neutralization of the black liquor with acid, washing and drying the lignin thereby precipitated, and dissolving this recovered lignin in aqueous alkali.

8. An improved method of clarifying aqueous liquids carrying insoluble matters colloidally suspended therein, which comprises introducing into such aqueous liquids lignin in water-solubilized condition, precipitating the lignin in situ to flocculate and coagulate the suspended matter and separating the clarified liquor from the flocculated matter.

FREDRICK J. WALLACE.